United States Patent
Hay et al.

(10) Patent No.: US 12,190,532 B1
(45) Date of Patent: Jan. 7, 2025

(54) ENHANCED PRESENTATION METHODS FOR VISUALIZING MOTION OF PHYSICAL STRUCTURES AND MACHINERY

(71) Applicant: RDI TECHNOLOGIES, INC., Knoxville, TN (US)

(72) Inventors: Jeffrey R. Hay, Prospect, KY (US); Mark William Slemp, Tellico Plains, TN (US)

(73) Assignee: RDI TECHNOLOGIES, INC., Knoxville, TN (US)

( * ) Notice: Subject to any disclaimer, the term of this patent is extended or adjusted under 35 U.S.C. 154(b) by 0 days.

(21) Appl. No.: 17/866,689

(22) Filed: Jul. 18, 2022

Related U.S. Application Data

(62) Division of application No. 16/656,003, filed on Oct. 17, 2019, now Pat. No. 11,423,551.

(Continued)

(51) Int. Cl.
*G06T 7/292* (2017.01)
*G01N 29/44* (2006.01)
(Continued)

(52) U.S. Cl.
CPC ............ *G06T 7/292* (2017.01); *G01N 29/44* (2013.01); *G06T 7/215* (2017.01); *G06T 7/285* (2017.01); *G06T 7/55* (2017.01); *G06T 7/70* (2017.01); *G06T 11/001* (2013.01); *H04N 1/62* (2013.01); *H04N 13/204* (2018.05);
(Continued)

(58) Field of Classification Search
None
See application file for complete search history.

(56) References Cited

U.S. PATENT DOCUMENTS

| | | |
|---|---|---|
| 4,523,230 A | 6/1985 | Carlson et al. |
| 5,517,251 A | 5/1996 | Rector et al. |

(Continued)

OTHER PUBLICATIONS

Meyer S., Sorkine-Hornung A., Gross M. (2016) Phase-Based Modification Transfer for Video. In: Leibe B., Matas J., Sebe N., Welling M. (eds) Computer Vision—ECCV 2016. ECCV 2016. Lecture Notes in Computer Science, vol. 9907. Springer, Cham. ( Year: 2016).

(Continued)

*Primary Examiner* — Stefan Gadomski
(74) *Attorney, Agent, or Firm* — Wyatt, Tarrant & Combs, LLP; Stephen C. Hall

(57) ABSTRACT

Embodiments described herein enhance the visualization of certain conditions contained in a video depicting motion in a field of view, in which the enhancements include but are not limited to one or more of: adjusting the appearance of video when objects are at different distances from a video acquisition device; aligning phase of motion obtained from different video acquisition devices; accentuating frequency phenomena that may be masked or obstructed in the presence of other frequencies of motion; differentiating motion data to obtain velocity or acceleration waveforms or spectra; applying a color scheme to pixels in a scene to highlight motion with specific characteristics or to amplify motion or provide indication of absolute motion; and determining spatial or temporal regions in the video to amplify based on the predetermined parameters.

10 Claims, 16 Drawing Sheets
(7 of 16 Drawing Sheet(s) Filed in Color)

Related U.S. Application Data

(60) Provisional application No. 62/787,963, filed on Jan. 3, 2019, provisional application No. 62/746,709, filed on Oct. 17, 2018.

(51) Int. Cl.

| | |
|---|---|
| *G06T 7/215* | (2017.01) |
| *G06T 7/285* | (2017.01) |
| *G06T 7/55* | (2017.01) |
| *G06T 7/70* | (2017.01) |
| *G06T 11/00* | (2006.01) |
| *H04N 1/62* | (2006.01) |
| *H04N 13/204* | (2018.01) |
| *H04N 23/68* | (2023.01) |
| *H04N 23/80* | (2023.01) |
| *H04N 23/90* | (2023.01) |

(52) U.S. Cl.
CPC ......... *H04N 23/6811* (2023.01); *H04N 23/80* (2023.01); *H04N 23/90* (2023.01); *G01N 2291/028* (2013.01); *G06T 2200/24* (2013.01); *G06T 2207/10016* (2013.01); *G06T 2207/30164* (2013.01); *G06T 2210/62* (2013.01)

(56) References Cited

U.S. PATENT DOCUMENTS

| | | |
|---|---|---|
| 5,604,856 A | 2/1997 | Guenter |
| 5,666,157 A | 9/1997 | Aviv |
| 6,028,628 A | 2/2000 | Aviv |
| 6,295,383 B1 | 9/2001 | Smitt et al. |
| 6,422,741 B2 | 7/2002 | Murphy et al. |
| 6,456,296 B1 | 9/2002 | Cataudella et al. |
| 6,474,166 B1 | 11/2002 | Osawa et al. |
| 6,727,725 B2 | 4/2004 | Devaney et al. |
| 6,774,601 B2 | 4/2004 | Swartz et al. |
| 6,792,811 B2 | 9/2004 | Argento et al. |
| 7,622,715 B2 | 11/2009 | Ignatowicz |
| 7,672,369 B2 | 3/2010 | Garakani et al. |
| 7,710,280 B2 | 5/2010 | McLellan |
| 7,862,188 B2 | 1/2011 | Luty et al. |
| 7,903,158 B2 | 3/2011 | Nobori et al. |
| 8,119,986 B1 | 2/2012 | Garvey, III et al. |
| 8,149,273 B2 | 4/2012 | Liu et al. |
| 8,170,109 B2 | 5/2012 | Gaude et al. |
| 8,242,445 B1 | 8/2012 | Scanion et al. |
| 8,351,571 B2 | 1/2013 | Brinks et al. |
| 8,374,498 B2 | 2/2013 | Pastore |
| 8,475,390 B2 | 7/2013 | Heaton et al. |
| 8,483,456 B2 | 7/2013 | Nagatsuka et al. |
| 8,502,821 B2 | 8/2013 | Louise et al. |
| 8,515,711 B2 | 8/2013 | Mitchell et al. |
| 8,523,674 B2 | 9/2013 | Patti |
| 8,537,203 B2 | 9/2013 | Seibel et al. |
| 8,693,735 B2 | 4/2014 | Keilkopf et al. |
| 8,720,781 B2 | 5/2014 | Wang et al. |
| 8,731,241 B2 | 5/2014 | Johnson et al. |
| 8,765,121 B2 | 7/2014 | Maslowski et al. |
| 8,774,280 B2 | 7/2014 | Tourapis et al. |
| 8,797,439 B1 | 8/2014 | Coley et al. |
| 8,803,977 B2 | 8/2014 | Uchima et al. |
| 8,811,708 B2 | 8/2014 | Fischer et al. |
| 8,823,813 B2 | 9/2014 | Manzel et al. |
| 8,831,370 B2 | 9/2014 | Archer |
| 8,874,374 B2 | 10/2014 | Bogucki |
| 8,879,789 B1 | 11/2014 | Figov et al. |
| 8,879,894 B2 | 11/2014 | Neuman et al. |
| 8,884,741 B2 | 11/2014 | Cavallaro et al. |
| 8,897,491 B2 | 11/2014 | Ambrus et al. |
| 8,924,163 B2 | 12/2014 | Hudson et al. |
| 9,006,617 B2 | 4/2015 | Mullen |
| 9,075,136 B1 | 7/2015 | Joao |
| 9,135,720 B2 | 9/2015 | Huang et al. |
| 9,805,475 B2 | 10/2017 | Rubinstein et al. |
| 10,021,371 B2* | 7/2018 | Pacheco ............ H04N 13/246 |
| 10,489,912 B1* | 11/2019 | Brailovskiy ......... H04N 13/204 |
| 10,582,137 B1* | 3/2020 | Benemann ............ G01S 17/08 |
| 2004/0032924 A1 | 2/2004 | Judge, Jr. |
| 2004/0081369 A1 | 4/2004 | Gindele et al. |
| 2004/0160336 A1 | 8/2004 | Hoch et al. |
| 2004/0184529 A1 | 9/2004 | Henocq et al. |
| 2004/0252230 A1 | 12/2004 | Winder |
| 2006/0009700 A1 | 1/2006 | Brumfield et al. |
| 2006/0049707 A1 | 3/2006 | Vuyyuru |
| 2006/0147116 A1 | 7/2006 | Le Clerc et al. |
| 2006/0251170 A1 | 11/2006 | Ali |
| 2007/0061043 A1 | 3/2007 | Ermakov et al. |
| 2007/0276270 A1 | 11/2007 | Tran |
| 2009/0010570 A1 | 1/2009 | Yamada et al. |
| 2009/0222228 A1 | 9/2009 | Gao et al. |
| 2010/0033579 A1 | 2/2010 | Yokohata et al. |
| 2010/0042000 A1 | 2/2010 | Schuhrke et al. |
| 2010/0091181 A1 | 4/2010 | Capps |
| 2010/0110100 A1 | 5/2010 | Anandasivam et al. |
| 2010/0324423 A1 | 12/2010 | El-Aklouk et al. |
| 2010/0328352 A1 | 12/2010 | Shamier |
| 2011/0019027 A1 | 1/2011 | Fujita et al. |
| 2011/0152729 A1 | 6/2011 | Oohashi et al. |
| 2012/0007960 A1* | 1/2012 | Kim ..................... G06V 10/462 348/51 |
| 2012/0182397 A1* | 7/2012 | Heinzle ................. G06T 7/80 348/47 |
| 2012/0207218 A1 | 8/2012 | Asamura et al. |
| 2013/0010093 A1* | 1/2013 | Redmann ............. H04N 13/122 348/E13.074 |
| 2013/0060571 A1 | 3/2013 | Soemo et al. |
| 2013/0176424 A1 | 7/2013 | Weil |
| 2013/0201316 A1 | 8/2013 | Binder et al. |
| 2013/0342891 A1 | 12/2013 | Lewis et al. |
| 2014/0002667 A1 | 1/2014 | Cheben et al. |
| 2014/0072190 A1 | 3/2014 | Wu et al. |
| 2014/0072228 A1 | 3/2014 | Rubinstein et al. |
| 2014/0072229 A1 | 3/2014 | Wadhwa et al. |
| 2014/0112537 A1 | 4/2014 | Frank et al. |
| 2014/0169783 A1 | 6/2014 | Nayak et al. |
| 2014/0205175 A1 | 7/2014 | Tanaka et al. |
| 2014/0236036 A1 | 8/2014 | de Hann et al. |
| 2014/0341470 A1 | 11/2014 | Lee et al. |
| 2014/0368528 A1 | 12/2014 | Konnola et al. |
| 2015/0134545 A1 | 5/2015 | Mann et al. |
| 2015/0221534 A1 | 8/2015 | van der Meulen |
| 2015/0379370 A1 | 12/2015 | Clifton et al. |
| 2016/0144404 A1 | 5/2016 | Houston et al. |
| 2016/0171309 A1 | 6/2016 | Hay |
| 2016/0217587 A1 | 7/2016 | Hay |
| 2016/0217588 A1 | 7/2016 | Hay |
| 2016/0232686 A1 | 8/2016 | Park et al. |
| 2016/0284072 A1 | 9/2016 | Hsu |
| 2016/0300341 A1 | 10/2016 | Hay et al. |
| 2017/0000356 A1 | 1/2017 | Smith, Sr. |
| 2017/0000392 A1 | 1/2017 | Smith |
| 2017/0078644 A1* | 3/2017 | Chen .................... H04N 13/271 |
| 2017/0119258 A1 | 5/2017 | Kotanko et al. |
| 2017/0135626 A1 | 5/2017 | Singer |
| 2017/0221216 A1 | 8/2017 | Chen et al. |
| 2017/0374354 A1* | 12/2017 | Zhu ...................... H04N 13/246 |
| 2018/0061063 A1 | 3/2018 | Buyukozturk et al. |
| 2018/0101090 A1* | 4/2018 | Lablans ................ H04N 23/54 |
| 2018/0177464 A1 | 6/2018 | DeBusschere et al. |
| 2018/0225803 A1 | 8/2018 | Elgharib et al. |
| 2018/0276823 A1 | 9/2018 | Barral et al. |
| 2018/0296075 A1 | 10/2018 | Meglan et al. |
| 2018/0335366 A1 | 11/2018 | Qiao et al. |
| 2019/0035104 A1* | 1/2019 | Cuban .................. G08B 13/196 |
| 2019/0043259 A1* | 2/2019 | Wang ..................... G06F 3/012 |
| 2019/0206068 A1 | 7/2019 | Stark et al. |
| 2020/0029891 A1 | 1/2020 | Swisher |
| 2020/0065957 A1 | 2/2020 | Hay et al. |
| 2020/0184638 A1 | 6/2020 | Meglan et al. |

(56) References Cited

U.S. PATENT DOCUMENTS

OTHER PUBLICATIONS

Ce Liu, Antonio Torralba, William T. Freeman, Fredo Durand, and Edward H. Adelson. 2005. Motion magnification. ACM Trans. Graph. 24, 3 (Jul. 2005), 519-526. (Year: 2005).
Hay, J.R. "High Dynamic Range Imaging for the Detection of Motion"\ pp. 18-141; dissertation University of Louisville (Kentucky); May 2011.
Liu et al., "Motion magnification", ACM Transactions on Graphics (TOG)—Proceedings of ACM SIGGRAPH 2005 TOG Homepage, vol. 24 Issue 3, Jul. 2005.
Mazen, et al.; A vision-based approach for the direct measurement of displacements in vibrating systems; article from Smart Materials and Structures; 2003; 12; pp. 785-794; IOP Publishing LTD; UK.
Rubinstein et al. ("Revealing Invisible Changes In The World (YouTube)", YouTube https://www.youtube.com/watch?v=e9ASH8IBJ2U, 2012.
Wadhwa et al., "Phase-based Video Motion Processing", also see YouTube https://www.youtube.com/watch?v=W7ZQFG7Nvw, SIGGRAPH 2013.
Wu et al., "Eulerian Video Magnification for Revealing Subtle Changes in the World", ACM Transactions on Graphics (TOG)—Proceedings of ACM SIGGRAPH 2012 TOG Homepage, vol. 31 Issue 4, Jul. 2012, Article No. 65.
Rubinstein et al. ("Eulerian Video Magnification" (YouTube), YouTube https:/twww.youtube.com/watch?v=ONZcjs1Pjmk, 2012).
Miyatake K, Yamagishi M, Tanaka N, Uematsu M, Yamazaki N, Mine Y, Sano A, Hirama M. New method for evaluating left ventricular wall motion by color-coded tissue Doppler imaging: in vitro and in vivo studies. J Am Coll Cardiol. Mar. 1, 1995;25(3):717-24 (Year: 1995).
Nobuo Yamazaki et al "Analysis of Ventricular Wall Motion Using Color-Coded Tissue Doppler Imaging System" 1994 Jpn. J. Appl. Phys. 33 3141 (Year: 1994).

* cited by examiner

INCLUDE:

Exclude:

ENHANCED PRESENTATION METHODS FOR VISUALIZING MOTION OF PHYSICAL STRUCTURES AND MACHINERY

CROSS REFERENCE TO RELATED APPLICATIONS

This patent application is a divisional application of, and claims the benefit of and priority to U.S. Nonprovisional Utility patent application Ser. No. 16/656,003, filed Oct. 17, 2019 and now patented as U.S. Pat. No. 11,423,551 having issued on Aug. 23, 2022, which claimed the benefit of priority to U.S. Provisional Application Nos. 62/746,709 filed Oct. 17, 2018 and 62/787,963 filed Jan. 3, 2019, respectively, the contents of all of which are incorporated herein by reference.

FIELD OF INVENTION

The present embodiments pertain to systems, apparatuses, and methods for analyzing movements in machinery and inanimate physical structures; processing of visual data related to such movements, and depiction of enhanced video showing such movements to evaluate one or more conditions of the objects shown.

BACKGROUND

All machines and physical structures produce vibrations and resonances of various kinds, some of which may be characteristic of normal operation and others of which may indicate off-normal conditions, unusual wear, incipient failure, or other problems. In the field of predictive maintenance, the detection of vibrational signatures is a key element of the diagnostic process in which the goal is to identify and remedy incipient problems before a more serious event such as breakdown, failure, or service interruption occurs.

U.S. Pub. No. 2016/0217587 (Ser. No. 15/757,245, filed Dec. 9, 2015) titled "Apparatus and Method for Analyzing Periodic Motions in Machinery" (Hay, Jeffrey R.; published Jul. 28, 2016) describes multiple embodiments that provide a non-contact vibration analysis system for machinery and structures. The embodiments described therein provide a number of features and advantages, not least among them is a flexible predictive maintenance tool, leading to diagnostic strategies that use vibrations associated with motion to provide process diagnostics or controls, in addition to a video-based tool for determining periodic motions in machinery without the need for edge visualization or other specific feature analysis.

Conventionally, analysts have used quantitative graphs, which render the time waveform or frequency spectrum of the motion of an object, in studying vibrational and other motions in machines. In other respects, however, motion amplified video derived from standard video recording of dynamic scenes also has been used for diagnosing machinery defects, understanding their severity, and determining the appropriate corrective action. Accordingly, systems or methods that apply an amplification factor to difference frames, then superimposing frames modified by an amplification factor back upon a selected reference frame produces enhanced video, with the ability to make small motions visible. Technology known as Iris M™ from RDI Technologies, Inc. (Knoxville, TN, USA) is an example of such capability. As first developed, an amplification factor in the IRIS M™ product is applied uniformly to all pixels being amplified in a field of view for a recording. However, this technique can still be improved upon. For example, adjusting for an object(s) at different distances in the field of view and reducing or removing the presence of large motions associated with regular motion or motion not of particular concern (e.g., auxiliary components in the scene) or innocuous transient events are method for enhancing an analyst's ability to distinguish fault conditions. Additional methods which enhance the visualization of higher frequency events in the presence of larger low frequencies involve differentiating the displacement data one or more times or highlighting selected regions of similar amplitude using color mapping, levels of transparency, or motion vectors applied to a motion amplified video.

For example, the descriptions contained in U.S. Pub. No. 2016/0217587, the full contents of which are incorporated by reference herein, refer to multiple embodiments of a system for analyzing periodic motions in machinery. Such a system described therein comprises one or more video acquisition devices, such as but not limited to a video camera, positioned at a selected distance from a machine component or physical structure (i.e., object). This video acquisition device-including any suitable lens or other optical components as known in the art-will be positioned with an unobstructed view of a selected portion of the object to obtain a video feed. This video, as is the case with the videos described in the present disclosure, is divisible into individual image frames, with each frame showing a static image of a scene, and with each frame being divisible into a plurality of pixels. In some embodiments, a system further comprises a data analysis system, including a processor and memory to analyze the video file, such as by measuring a value characteristic of the object's physical movement over time to thereby determine the periodicity of that movement. This system further comprises a data storage system to archive the video for later retrieval, allowing comparison of images and measurements of motion that are obtained from the video. Such comparisons can be made with respect to static images in the image frames or from an enhanced version of the video. This comparison is the foundation for providing a representation of the object's movement data.

The field of view when acquiring data from troubleshooting machinery includes a collection of objects which are located at varying distances from the lens of the camera. To obtain accurate displacement measurements, it is important to factor the distance from the video acquisition device to the object. Also, in some instances the distance or the perspective from the first video acquisition device to the object may differ from that of the second video acquisition device. As each video generates a signal indicative of an intensity value of at least one pixel contained in at least one frame, the intensity of the at least one pixel varies with motion of the object.

Likewise, the same potential problems exist when obtaining video for multiple objects appearing in a single frame, where a frame provides a static depiction of a scene being captured by the video acquisition device. Otherwise, if a first object and a second object are both in the scene captured by one or a plurality of video acquisition devices, but the respective objects are at different distances from each video acquisition device, each object might undergo the same movement, but it will appear different on the video unless the distance is taken into account properly. And the converse is true, in that the second object might be further away, and exhibiting much larger movement and displacement in space than the first object. Yet because the distances are different, the movement in the two objects will be perceived by the video acquisition device as though the displacement was not as large in the second object.

With the human eye, this is referred to as the perspective illusion, and the result is the further away objects are, the smaller their visual angle, and thus the smaller their image on the retina. The same is true when evaluating motion in the objects discussed above, in terms of the reduced visual angle, except instead of appearing smaller on the retina the object images will appear smaller to the lens of the video acquisition device as the distance increases.

Conventionally, with respect to multiple machines and objects whose motion is evaluated with one or more video cameras, distance adjustments have been made by measuring a property of motion, such as amplitude, at consistent locations upon each object. For example, distances between each location on each object from the camera or cameras could be determined with a laser rangefinder, then used to adjust the objects' video appearance based on these different distances. This is not, however, a favorable solution in that each distance must be determined at a pixel level, so the work is very cumbersome.

Often, the conditions meant to be captured by the video acquisition device are more complex than merely focusing on a single object. The embodiments described herein overcome the perspective illusion problem by incorporating depth and distance data as motion is being evaluated, without resorting to manual measurements that must be input for numerous locations.

Other phenomena which impede the recognition of significant vibratory behavior related to machinery diagnostics is the presence of large motions which are present at distinct locations spatially or temporarily which overshadow subtle but significant vibrations. Similarly, displacement measurements typically contain low frequencies with larger amplitudes and higher frequencies which fall off in amplitude with increasing frequency. Consequently, higher frequency periodic signals are commonly harder to visualize in the displacement domain. Amplified video may have many different motions present simultaneously, and this is a condition that can make it difficult for an analyst to quickly identify areas of a video which deserve more intense scrutiny.

SUMMARY

Generally, motion captured by a video acquisition device, e.g., a video camera (sometimes referred to as "camera" herein for brevity), can be saved as a video file having a sequence of video images comprising at least two individual still image frames, which are divided into pixels defined by two or more spatial coordinates within the frame. As such the video file can be played back with the positioning of any object or portion of an object being represented with X, Y spatial coordinates aligning with horizontal and vertical planes, respectively. As used herein, the term "object" may include any or all of a machine, a component of a machine, a physical structure, a component of a physical structure, and one or more regions of a machine, machine component or physical structure, in which said object or objects are in motion and video of such motion is acquired and evaluated.

When troubleshooting equipment using video recordings of the equipment in motion, one desires to locate the vibrations related to a fault in a machine in the presence of other motion which may be larger in magnitude but represents normal machine motion. It is common that most machines exhibit motion at the frequency which they rotate or reciprocate, however, in many cases this motion is associated with normal operation and does not indicate that a fault condition is present. On the other hand, certain machine faults manifest vibration at frequencies related to the physics of the failure mechanism. Hypothetically, faults in antifriction bearings often occur at frequencies which may be 4 to 60 times the machine rotational frequency. The presence of large amplitude vibrations which may result during a transient condition or be associated with another object in the field of view can mask lower amplitude motion of importance on a defective machine component. To facilitate accurate field troubleshooting and locate abnormal vibration, present embodiments process the dynamic information obtained from each pixel to portray amplified motion videos accurately and use processing techniques such as, for example, mathematically differentiating signals for the amplified video to accentuate higher frequency motion in a scene and to attenuate other motions such as lower frequencies associated with normal machine operation. Through techniques described herein, present embodiments also scan through the amplified motion videos and qualify real movement from other phenomena which may affect the intensity of pixels such as external lighting conditions and other effects which may temporarily compromise the field of view.

In some embodiments according to the present disclosure, the systems and methods disclosed herein enable a user to make a recording with a 3-D camera and record a distance for every pixel in the screen. An Intel® RealSense™ Depth Camera D435 (Intel Corporation, Santa Clara, CA) is a suitable 3-D camera for these purposes. The software may use that data to calibrate motion measurements made throughout the scene depicted in one or more images. For example, in some embodiments, multiple components are depicted in a scene and calibrating the motion of multiple objects as a function of the intensity of the signal involves adjusting for differences in distance or perspective, or both, of each object relative to the first and second video acquisition devices. When combined with detailed distance measurements from each video acquisition device to one or more objects, it facilitates the interpretation of the intensity data in at least one pixel by taking into account if a particular region is situated further from the video acquisition device. In this way, the present embodiments reduce or eliminate the perspective illusion.

Likewise, in some embodiments, software (machine readable program instructions) is utilized that will combine two videos of different perspective—or two objects in a single scene—and phase align them. Herein, the term "phase" refers to temporal placement of the signal acquired from the object's motion that enables one signal to be evaluated or characterized relative to another signal (e.g., that of the same object's motion from a different perspective) and to relate those signals to patterns of repetitive events such as periodic motion. In doing so, present embodiments include those wherein the software uses a common direction of motion the two videos share to align them, a feature that is particularly useful in a steady state and/or filtered video.

Other features and advantages related to acquiring images and mathematically processing the waveforms derived from the light intensity associated with each individual pixel in a scene are disclosed herein as well. In this regard, a measured vibration parameter when processing the light intensity waveform from a pixel is related to the displacement of the motion. Amplified displacement video may tend to emphasize amplitudes of the lower frequencies present, which also can tend to visually mask higher frequency vibratory motion. Taking the display of motion a step further, however, mathematically performing a first differentiation of the displacement motion results in displaying the vibration in a velocity parameter. Likewise, mathematically performing a second differentiation results in presenting the vibration in the acceleration domain. Following from these steps, creating a motion amplified video in the velocity or the acceleration domain will emphasize the higher frequency vibration magnitudes in contrast to the lower frequency vibration. For example, in some embodiments, the system differentiates the video once or multiple times to facilitate the analyst in visually examining higher frequency phenomena which may be needed to characterize certain machinery faults. The signal can be integrated to return to the displacement domain.

Additionally, some embodiments are configured to apply automatically a color scheme to vibration measurements, where the color palette is indicative of the absolute motion that is sensed by the video acquisition device. This is known as color overlay, which is an enhancement beyond typical gray scale renderings of displacement used in many conventional systems. The color map can be superimposed on the amplified video to allow the analyst to focus on areas of significant motion and to visually differentiate against apparent motion that is due to lighting changes or locations of high contrast in the images. This ability to visually qualify the color coded amplitudes cannot be done when color mapping is only applied to a single frame from the video.

By the practice of embodiments described herein, the features and benefits described above, as well as others, will be attainable to the user.

BRIEF DESCRIPTION OF DRAWINGS

The patent or application file contains at least one drawing executed in color. Copies of this patent or patent application publication with color drawing(s) will be provided by the Office upon request and payment of the necessary fee.

The drawings and embodiments described herein are illustrative of multiple alternative structures, aspects, and features of the present embodiments, and they are not to be understood as limiting the scope of present embodiments. It will be further understood that the drawing figures described and provided herein are not to scale, and that the embodiments are not limited to the precise arrangements and instrumentalities shown.

In FIG. 9A, the property of motion is displacement. In FIG. 9B, the property of motion is velocity, and in FIG. 9C the property of motion is acceleration.

MULTIPLE EMBODIMENTS AND ALTERNATIVES

The processes of creating motion-amplified videos using the light intensity changes of all pixels in a single field of view by processing the pixel data uniformly across all pixels, comparing synchronized data from cameras positioned at different visual perspectives, or adding color highlighting to a single frame of the video, can potentially create misleading results or increase the amount of time it will require from an analyst to identify specific vibrational motion associated with a possible fault condition. In these respects, embodiments described herein introduce methods that can supplement the tools available to an analyst to quickly locate motion of interest in a field of view having various sources of motion, contributing both normal vibration as well as faulty conditions. Accordingly, effective troubleshooting will benefit from enhanced visualization methods, and such enhanced methods in according with present embodiments will overcome challenges such as the following: (i) when different objects in a scene are positioned at different distances from a video acquisition device (e.g., camera) displacement of different objects is not correctly represented without applying the correct distance to each object; (ii) data collected from a single point of view may result in obstruction by other components of objects experiencing a fault condition; (iii) displaying the amplified displacement visually emphasizes motion from lower frequencies and may mask visually higher frequency phenomena; (iv) certain spatial or temporal regions in the recorded video may have extraneous or normal motions which mask smaller motions related to the defect condition; and (v) screening of amplified video can be more difficult due to factors that include numerous sources of motion present in a scene or lighting changes, area with high contrast, non-uniform transmission path, or translational motion in the scene creating apparent motion.

In some embodiments, use of a second camera, whose operation is coordinated with a first camera, can be well understood by considering a scene looking at a 30 Hz motion in a motor. When a video is taken from a first perspective using a first video acquisition device, for example at 0 degrees and therefore parallel to a motor shaft (which we would consider the object in this example), this video can be combined with that obtained with a second video acquisition device recording from a perspective at 90 degrees perpendicular to the same motor shaft. Here, it will be understood that very often, a user will take these videos simultaneously, with two different cameras so the same motion is being obtained from two different perspectives.

Figure 1A:
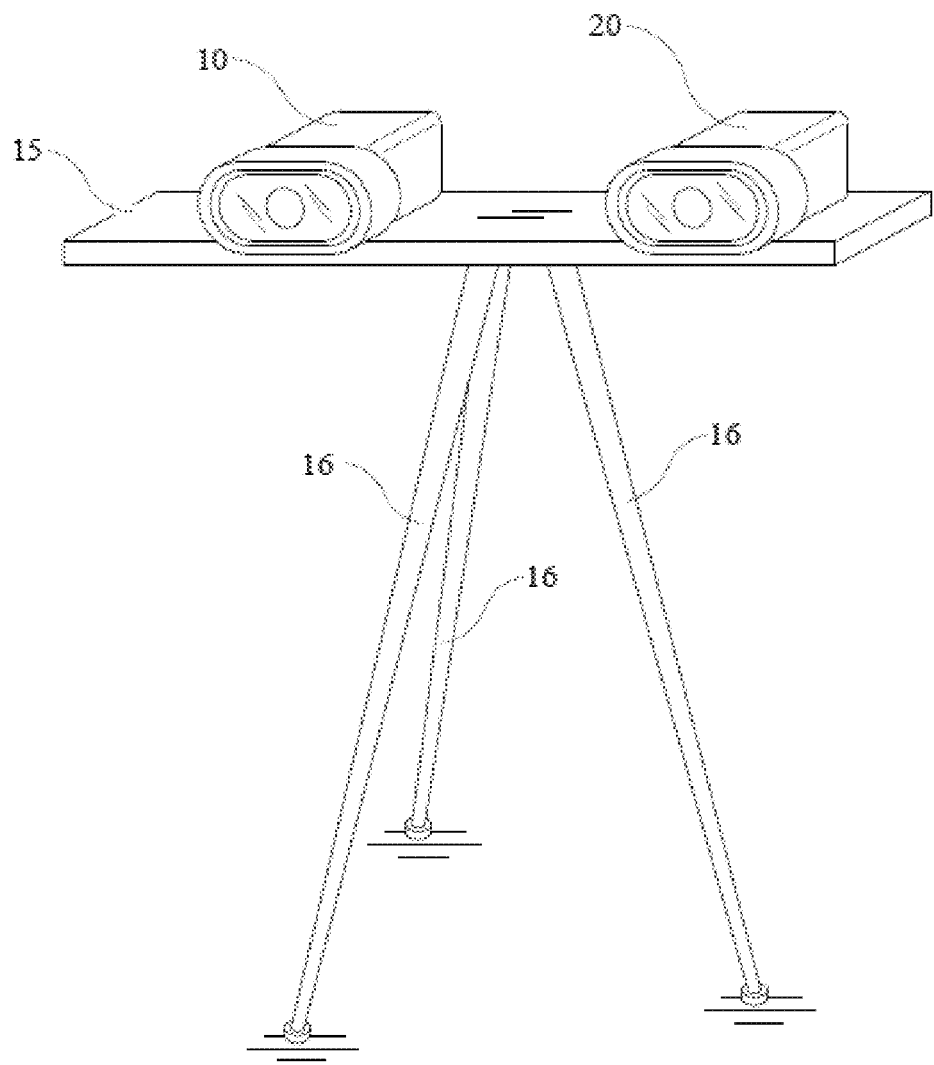
FIG. 1A is a schematic of a first video acquisition device, denoted as a camera in this instance (camera 1), and a second video acquisition device (camera 2) positioned to acquire video of the motion of one or more objects, according to multiple embodiments and alternatives.

It will be appreciated that the descriptions of dual devices acquiring video are provided in the context of several illustrative use cases providing different options to an end user. One use case as depicted in FIG. 1A employs first and second video acquisition devices of the same kind, for example video cameras 10 and 20. At the option of an end user, the video acquisition devices can be situated on platform 15 supported by legs 16. In some embodiments, it is the video from one of either camera 1 or camera 2 (i.e., video acquisition devices) which is used to produce motion amplification. Such a scenario might be if the condition related to displacement is viewed particularly better from the perspective of one or the other video acquisition device. In regards to motion amplification, U.S. Pub. No. 2016/0300341 (Ser. No. 14/999,660, filed Jun. 9, 2016) titled "Apparatus and Method for Visualizing Periodic Motions in Mechanical Components" (Hay, Jeffrey R., et al.; published Oct. 13, 2016 and subsequently issued as U.S. Pat. No. 10,062,411) describes embodiments that may utilize a single camera to visualize and process the information related to an object's physical movements. Such processing includes comparing amplitude of movement as a function of pixel intensity in order to create motion amplification that displays a modified video in which the original signal is represented by an altered value modified by an amplification factor. The contents of this published application are fully incorporated herein by reference.

Figure 1B:
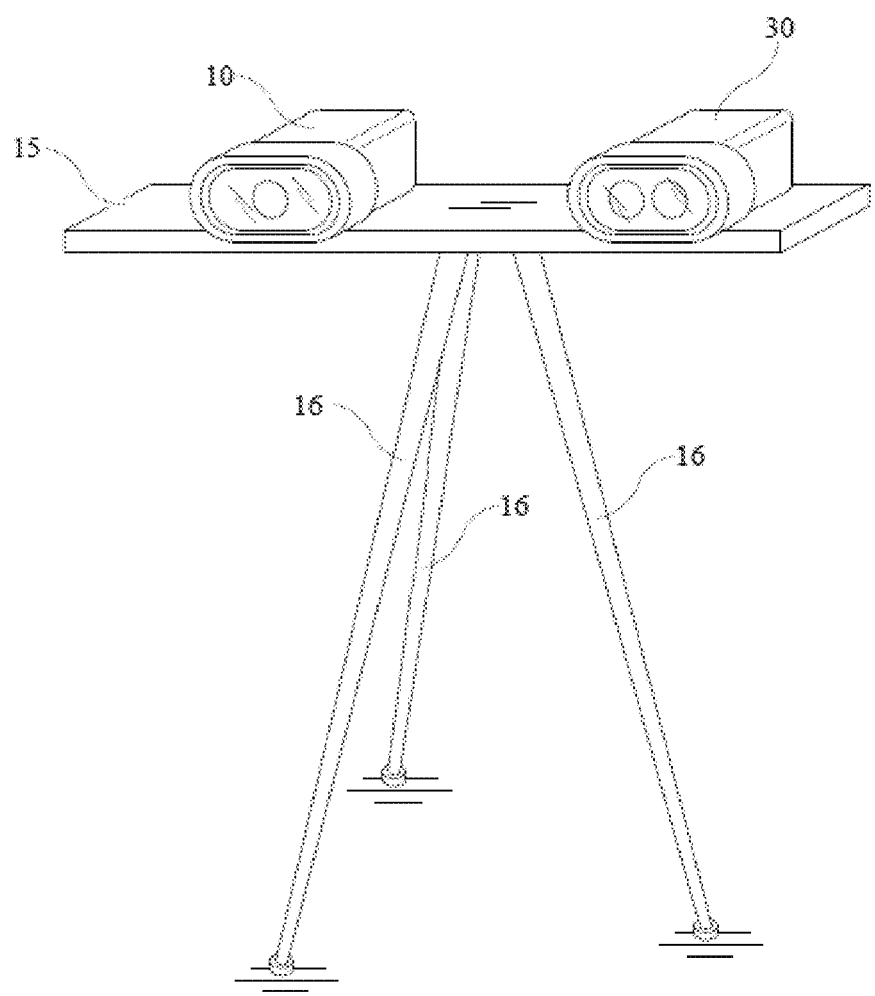
FIG. 1B is a schematic of a first video acquisition device, denoted as a camera in this instance, and a second video acquisition device, denoted as a 3-D camera in this instance, positioned to acquire video of the motion of one or more objects, according to multiple embodiments and alternatives.

In some embodiments, both cameras are used to produce motion amplification with distance adjustment. Another use case as depicted in FIG. 1B is to employ a first video acquisition device, video camera 10, and a second video acquisition device, which in this use case is represented as 3-D camera 30 providing distance information. It will be appreciated that using 2-dimensional video cameras for camera 1 and camera 2 provides a similar net effect as having a 3-D camera, because in either case, both motion amplification and a pixel-by-pixel motion map can be produced from the acquired video. In some embodiments, this second video acquisition device is for distance adjustments. Optionally, the second video acquisition device is a 3-D camera that automatically establishes distances from the video acquisition device to the object and provides a motion map that correlates all distances to the various regions of the object being studied.

Figure 2A:
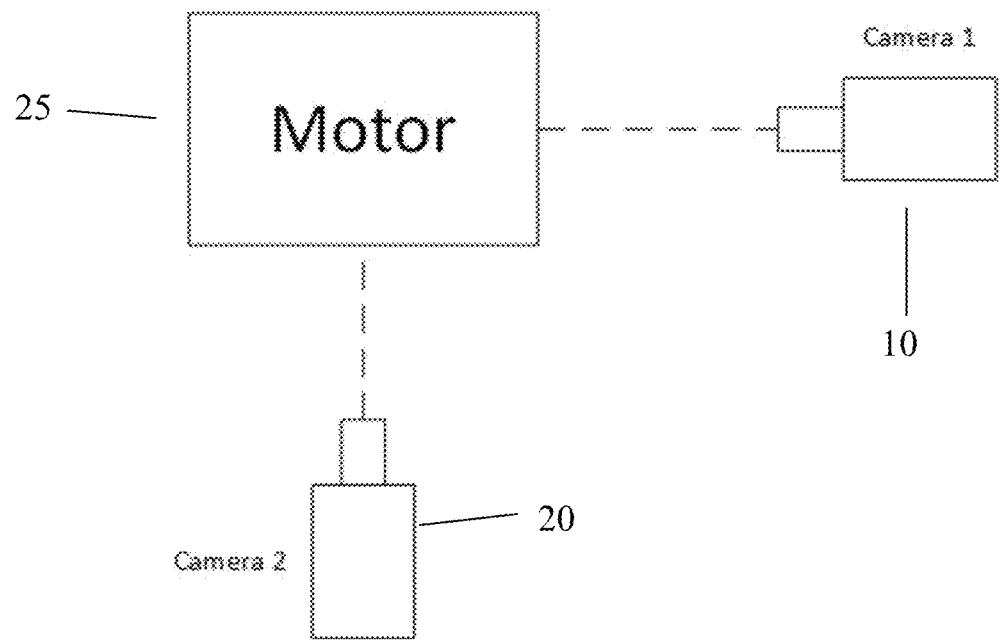
FIG. 2A is a schematic of a first video acquisition device and a second video acquisition device, in this instance denoted as camera 1 and camera 2, respectively, trained upon an object, according to multiple embodiments and alternatives.
Figures 3A, 3B:
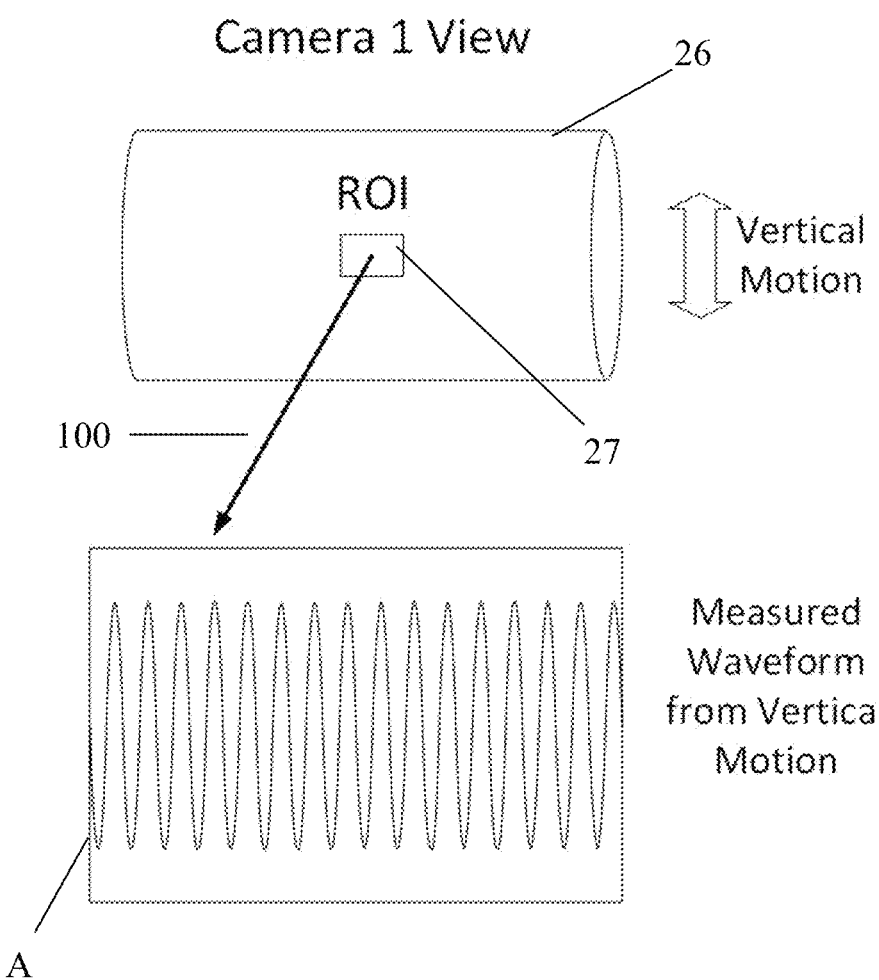
FIG. 3A represents a situation where the depiction of motion of a moving object (e.g., shaft of FIG. 2B) is acquired by a first video acquisition device (camera 1), according to multiple embodiments and alternatives.
FIG. 3B represents a waveform associated with vertical displacement of an object as depicted in FIG. 3A, according to multiple embodiments and alternatives.

An optional feature of these use cases is to train both video acquisition devices side-by-side essentially viewing the movement of an object in relation to the same axes, as shown for example in FIG. 1A. Yet another optional feature of these use cases is to train both video acquisition devices either along the same angle, or as may be desired from different positions or at different angles relative to an object or objects undergoing motion, such as motor 25 represented in FIG. 2A or shaft 26 that articulates vertically. In FIG. 3A, a region of interest (ROI) 27 is an area of the object (in this case, shaft) that is included in a scene captured by both video acquisition devices.

When an object undergoes periodic motion, such as shaft 26 in the representative scenario, it proceeds through cycles of movement that can be depicted as waveforms that contain maximums for a particular measurement such as amplitude (apexes, or high peaks in FIGS. 3B, 4B, 5A, 5B, 6A, and 6B) and minimums (a series of nadirs, or low peaks, in the same figures). In some embodiments, waveforms are represented as a plot of displacement of an object such as a component of a machine over time, for example the time duration associated with video acquired of the object or component in motion. Techniques for generating such a waveform to characterize motion in machines and machine components are disclosed in U.S. Pat. No. 9,704,266 titled "Non-contacting monitor for bridges and civil structures" as issued on Jul. 11, 2017, the contents of which are fully and expressly incorporated by reference herein.

Figure 2B:
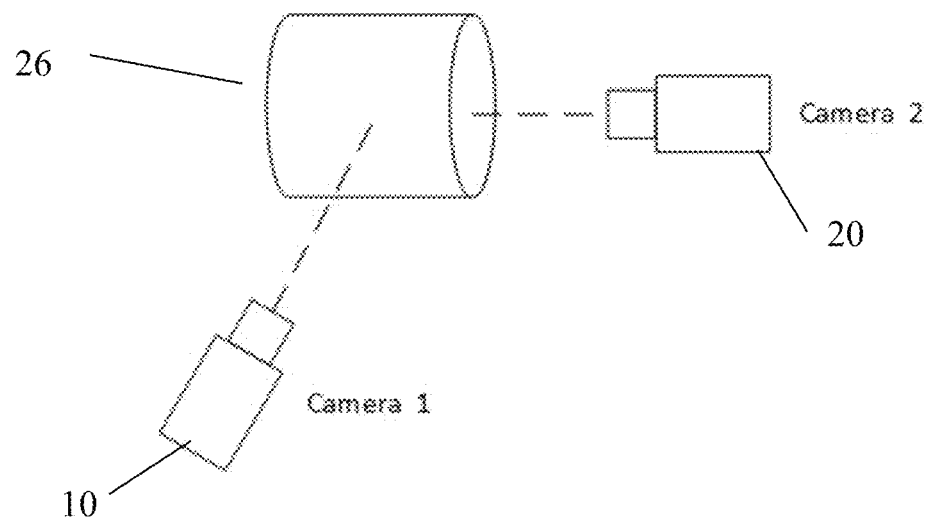
FIG. 2B is a schematic of a first video acquisition device and a second video acquisition device, in this instance denoted as camera 1 and camera 2, respectively, trained upon an object, according to multiple embodiments and alternatives.

Accordingly, it is beneficial to capture the motion of an object from different perspectives because conditions that signify possible developing problems in the machinery, such as misalignment, might be more visible in one axis than in another axis. That is to say, such conditions might be more visible from the perspective of camera 2 in FIG. 2B than in camera 1, or vice versa. Consequently, capturing video images of the movement with both cameras thus is advantageous.

Figures 4A, 4B:
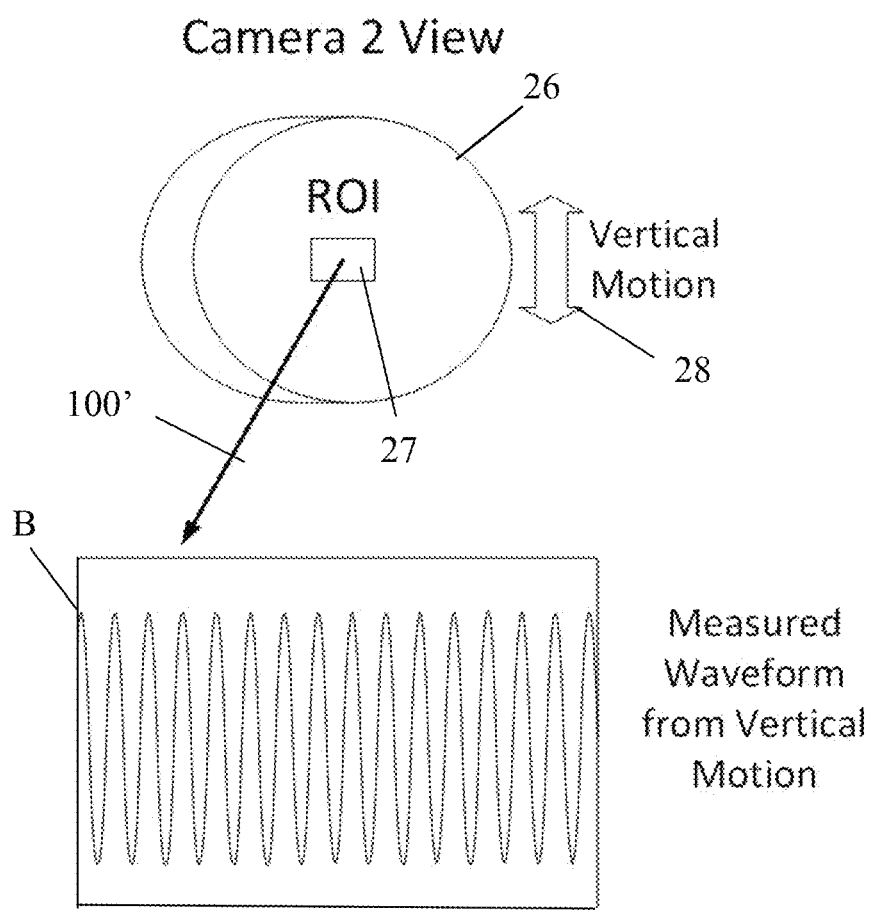
FIG. 4A represents a situation where the depiction of motion of a moving object (e.g., shaft of FIG. 2B) is acquired by a second video acquisition device (camera 2), according to multiple embodiments and alternatives.
FIG. 4B represents a waveform associated with vertical displacement of shaft motion acquired by a second video acquisition device (camera 2) as depicted in FIG. 4A, according to multiple embodiments and alternatives.

However, this duality also presents practical challenges. For example, if it is practical to do so, one might desire in the practice of current embodiments to choose to synchronize the cameras at the start so they begin at the precise same moment (through a cable joining the video acquisition devices that receives the start input or command simultaneously, or some other known method). If this were the case, it would not be necessary to synchronize the waveforms produced from the video images. Even so, when simultaneous starting of the video acquisition devices is not chosen or proves infeasible, the phases obtained in the waveform from camera 1 and camera 2 are likely to be out of phase alignment. This is depicted schematically in FIGS. 3A, 3B, 4A, and 4B in that camera 1 and camera 2 are both trained on the same region of interest 27 of the same object (shaft 26) in periodic motion, yet the waveform generated as denoted by arrow 100 is from the view of camera 1 in FIG. 3B and begins at a point "A" on the waveform that is near a low peak. Conversely, from the view of camera 2, the waveform generated after processing according to present embodiments is denoted by arrow 100' as shown in FIG. 4B and begins at a point "B" that is near a high peak. This phase misalignment will impair or prevent the ability to perform motion amplification on the object, and thus would need to be resolved.

Figure 5A:
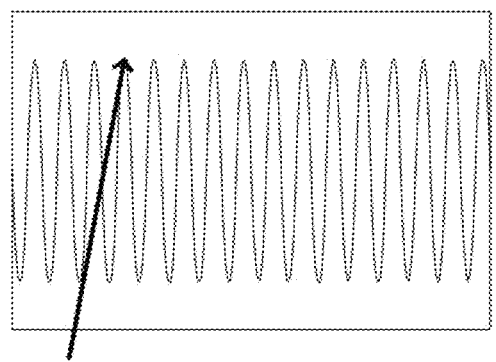
FIG. 5A is another depiction of a waveform associated with vertical displacement of an object as depicted in FIG. 3A, according to multiple embodiments and alternatives.
Figure 5B:
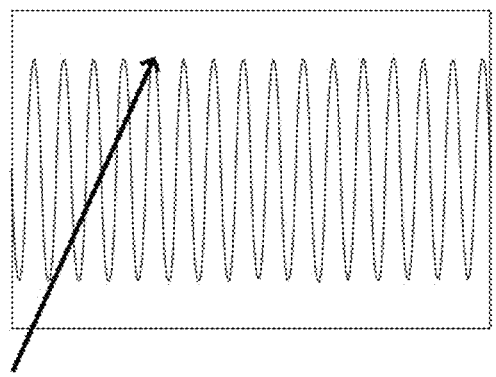
FIG. 5B is another depiction of a waveform associated with vertical displacement of an object as depicted in FIG. 3B, according to multiple embodiments and alternatives.
Figure 6A:
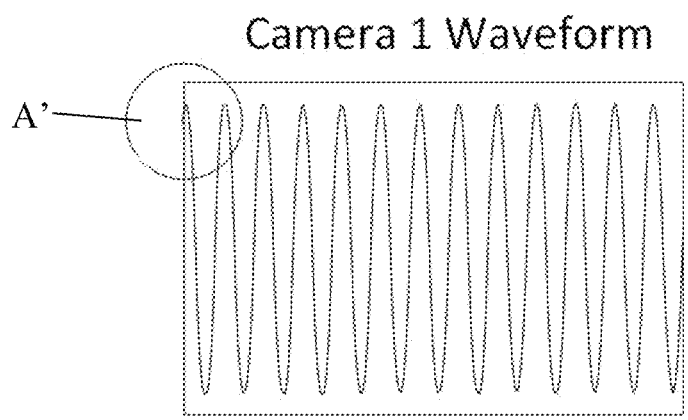
FIG. 6A is another depiction of a waveform associated with vertical displacement of an object as depicted in FIG. 3A, after having been processed in accordance with multiple embodiments and alternatives.
Figure 6B:
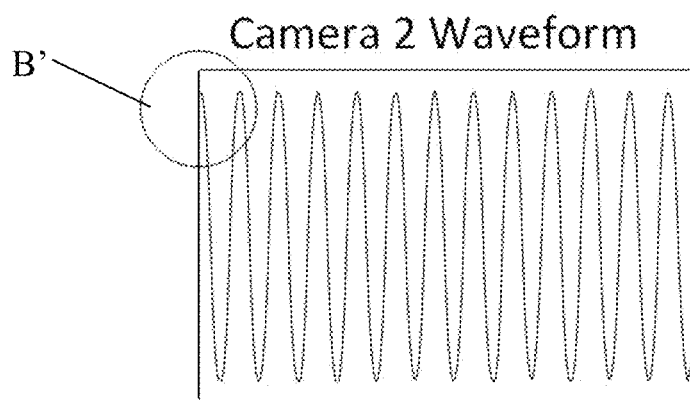
FIG. 6B is another depiction of a waveform associated with vertical displacement of an object as depicted in FIG. 3B, after having been processed in accordance with multiple embodiments and alternatives.

FIGS. 5A and 5B show the waveforms from camera 1 and camera 2, respectively, in which a particular frame and point in time are at a point where amplitude is at a maximum, i.e., a high peak. In FIGS. 6A and 6B, further processing according to present embodiments results in the data generating the waveforms being clipped (also referred to as "cut," i.e., to shrink the time of the video). Clipping results in the waveform coinciding with that particular frame and point in time. In some embodiments, advantages are gained when the video acquisition devices being employed in unison synchronize and clip in one common\shared axis in order to apply this same clipping to the non-shared axis of both cameras. By doing so, the videos and all of the waveforms are phase synchronized. For example, consider a scene in which a Horizontal axis is represented by a flat surface supporting an object, and a Vertical axis is perpendicular to the Horizontal axis. It will be appreciated that a moving object such as a reciprocating shaft might move Axially, being neither entirely Horizontal or Vertical. In such a scenario, with camera 1 being used to measure displacement along the Horizontal and Axial axes of moving shaft 26, and camera 2 being used to measure displacement along the Vertical and Axial axes of the same shaft 26 as it underwent the same motion, this would synchronize the waveform from each video and enable clipping to synchronize the two videos and the respective Horizontal and Vertical waveforms. Such a result is seen in the transformation of the waveforms in FIGS. 5A/5B to those in FIGS. 6A/6B. For the representations in FIGS. 6A and 6B, video data has been cropped so that the first video frame in each video begins at a point of maximum amplitude, represented by waveform point A' for camera 1 in FIG. 6A, and waveform point B' for camera 2 in FIG. 6B.

The result of phase synchronization is each waveform will now begin at a point where the phase of the cycle is at a maximum amplitude or high peak, as seen for points A' and B' in FIGS. 6A and 6B, respectively. Here is shown clipping that coincides with a maximum amplitude. Alternatively, clipping could coincide with a low peak, or minimum displacement of the object, as captured in a particular frame at a particular point in time. For example, consider shaft 26 as an object whose motion as viewed from each camera travels along a y-axis in a coordinate system, generally depicted as arrow 28 in FIG. 4A. In some embodiments, the video obtained by the video camera is processed by clipping the video (removing a portion of time at the beginning of the video file), leaving a subset of video having a starting frame that begins at a point where the machine component is positioned at the highest point of movement in the y-direction (e.g., at a point furthest from a supporting surface such as a level foundation). Alternatively, the subset of video has a starting frame that begins at a point where the machine component is positioned at its lowest point of movement in the y-direction (e.g., at a point closest to the foundation as mentioned in the previous sentence). Either alternative would produce a waveform extracted from the video with a maximum amplitude of motion in the y-direction at the beginning.

Now consider an extension of this same embodiment under the same scenario as described above, but with the video camera repositioned at 90° in the horizontal dimension (i.e., x-axis in a coordinate system, also identified as the dimension perpendicular to the vertical dimension mentioned above). With this change in position, only the camera's positioning along the x-axis has changed, with the orientation of the video camera for sensing movement in the y-axis dimension remaining unchanged. In this extension of the embodiment, clipping is repeated and again produces a waveform extracted from the video with a maximum amplitude of motion in the y-direction at the beginning. Now both clipped videos have a starting frame and waveform that begins at a maximum amplitude. This results in phase alignment of the motion that is depicted in the two clipped videos being phased aligned when the videos are played simultaneously. In some embodiments, a user will filter the visual data to obtain movement at a particular frequency or frequency range so the motion in phase alignment between the two clipped videos will be at a consistent frequency. This ensures that the two clipped videos remain phase aligned with respect to the motions represented in each. U.S. application Ser. No. 16/009,749, "Monitoring of objects based on frequency spectrum of motion and frequency filtering" filed Jun. 15, 2018, describes such a filtering regimen. The entire contents of application Ser. No. 16/009,749 and continuation or divisional applications, if any, are fully incorporated by reference herein, including without limitation a feature whereby a given frequency or frequency range is selected, and the video is processed so motion characterized by any other frequency is rendered frozen, still and static when the video is played.

Figure 7:
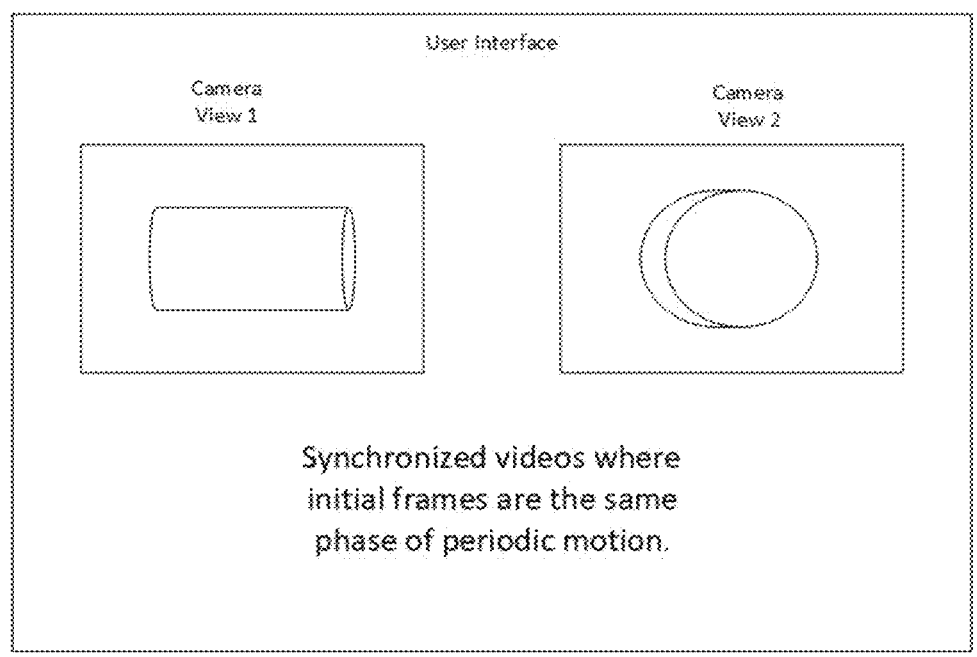
FIG. 7 is a display of side-by-side views obtained from a first video acquisition device (camera 1) and a second video acquisition device (camera 2) of an object (shaft of FIG. 2B) in motion, according to multiple embodiments and alternatives.

The resulting views are then captured as synchronized videos as seen in FIG. 7, where the initial frames are at the same phase of periodic motion. In some embodiments, the synchronized videos are viewable side-by-side as a display on a monitor as shown in FIG. 7, where the angle from camera 1 and the angle from camera 2 show the object from different perspectives. In some embodiments, clipping the waveform and synchronizing the videos can be better achieved when the video has been filtered to a singular frequency. Thus, at the option of an end user, video data may be prefiltered to a single frequency prior to synchronization for improved results, as described in the aforesaid U.S. application Ser. No. 16/009,749, "Monitoring of objects based on frequency spectrum of motion and frequency filtering."

Now adding further to what is contained above, additional descriptions are provided below to give further detail to enhancements available from the practice of one or more embodiments contained herein.

Combining Video from First Camera and Distance Data from Second Camera

As previously stated, when different objects in a scene are positioned at different distances from a camera, the displacement of these objects might be incorrectly represented. Accordingly, in some embodiments, distance adjustments are made for multiple objects in a scene, whose motion is being acquired with the same two cameras. To accomplish this objective, the second video acquisition device is configured to acquire distance information used by the first video acquisition device, as various cameras are equipped from software able to measure distance from the camera to specific points on an object. As discussed below, the acquired distance data then is used to adjust when different objects or locations are at varying distances from the camera. In other words, detailed distance information from a location on the second video acquisition device, such as a lens, is received by the first video acquisition device and overlaid upon the scene captured by the first video acquisition device, in order to correlate all distances from the first video acquisition device to every location of an object being studied. This reduces or eliminates the need to take specific measurements, such as with a laser range finder, thus making the current systems and methods more efficient while adding a stereoscopic quality to the depictions of the object. Essentially, this enables the data to be combined from two sources for a more robust indication of how the object is moving, how it is being displaced, and whether such displacement is in a normal course or indicative of a present or future potentially serious problem.

In an optional use of the present embodiments, the second video acquisition device is a 3-D camera, designed to provide mapping of the motion occurring in the scene being captured. The 3-D mapping includes detailed distance information which can be overlaid on the images obtained by the first video acquisition device.

In use, a data analysis system in accordance with one or more of the present embodiments filters these videos to show only motion at a preselected frequency, for example the 30 Hz motion. These videos would share a common direction of motion in the vertical direction of shaft movement. As desired, system software automatically locates a point in the two videos where the 30 Hz waveform is in the same phase location. For example, the 30 Hz motion is at 0 degrees of phase when camera 1 is positioned straight at the object being evaluated, with camera 2 positioned 90 degrees relative to camera 1. A simple scenario of camera positioning might be camera 1 pointing at the front of an object, and camera 2 pointing at the side of the same object (assume here that both cameras are positioned at the same height along the y-axis relative to the object). The software in some embodiments is configured at this point to synchronize the videos to play back simultaneously now that vibrations occurring at a frequency(-ies) of interest (e.g., 30 Hz) are placed in phase for the particular object at the different perspectives, which enables the motion to be seen and evaluated from the perspectives of parallel with the object (camera 1, viewing the object from a point which could be considered the front of the object) and perpendicular (camera 2, viewing the object from the side).

Figure 8A:
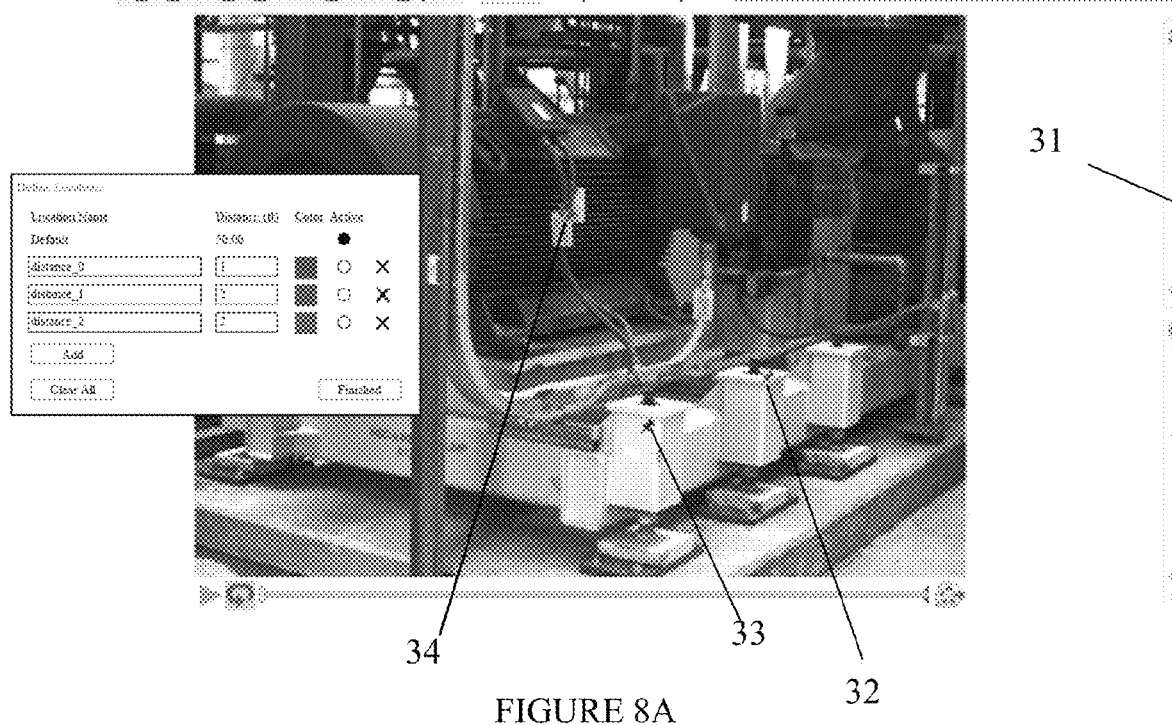
FIG. 8A depicts a scene having a motor supported by a foundation and FIG. 8B depicts how particular locations within that scene can have their distances from the video camera applied for consistency of measurement, according to multiple embodiments and alternatives.
Figure 8B:
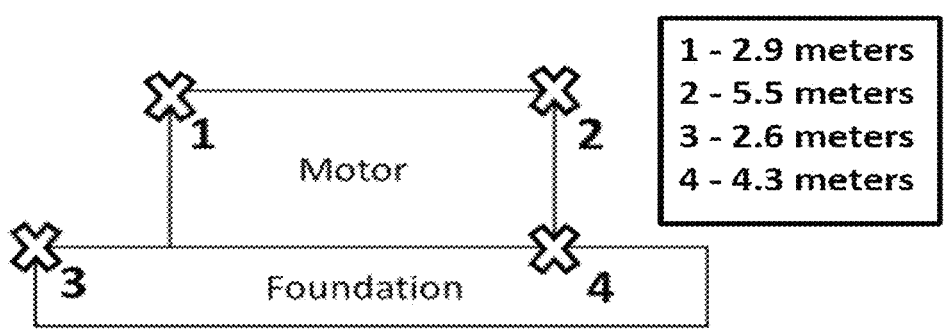

Additional features according to some of the present embodiments include distance measurement, such as when the measurement of a movement of interest depends on the distance between the camera and the object. For example, a need for distance adjustments may arise when the movement being tracked involves multiple locations of a single machine or machine component whose respective distances to the camera vary. FIGS. 8A-8B further illustrate such a scenario, for which the machine in FIG. 8A could be associated with different components of a motor being found at multiple distances from the camera. In accordance with present embodiments, a user may pick a location in the image, such as a region of a motor (designated as points 1 and 2 in FIG. 8B) or a region of a foundation the motor rests upon that is under analysis (designated as points 3 and 4 in FIG. 8B) and apply a distance to that location. This can be done at multiple locations on the object that are selected by a user and identified by markers identifying the locations in a selected frame of the video, with the information retained in the data. In this manner, some embodiments allow for the software operating on the system to recognize or apply a distance associated with the area the user is selecting to measure. For example, in FIG. 8A, color coded pins 32, 33, and 34 can be used to designate which point on the machine or its surroundings is associated with a particular distance from the camera according to the table in FIG. 8B. Once the distance information to the various locations is input, or otherwise determined as described above, a user (or the system by default) indicates which distance is active for making measurements, and this data can be recalled as desired and applied when making a measurement of the object's motion. For example, the inset box in FIG. 8A contains columns for "location name" and designates each with a particular "color" of a pin indicator seen in the frame, and the box provides a status indicator of which of these locations is "active". The distance for measuring motion can thus be indicated, either as a default or as a selectable location represented by the color of the pin used to indicate the location in the frame.

Employing Velocity and Acceleration Data

In some embodiments, the system is configured to differentiate the video once or multiple times. Differentiating the video signal results in a modified video representing motions indicative of velocity, and further differentiation gives rise to a modified video representing motions indicative of acceleration of objects in the field of view. Embodiments, therefore, are able to create amplified videos of the velocity or the acceleration of the motion depicted in the video.

Figure 9A:
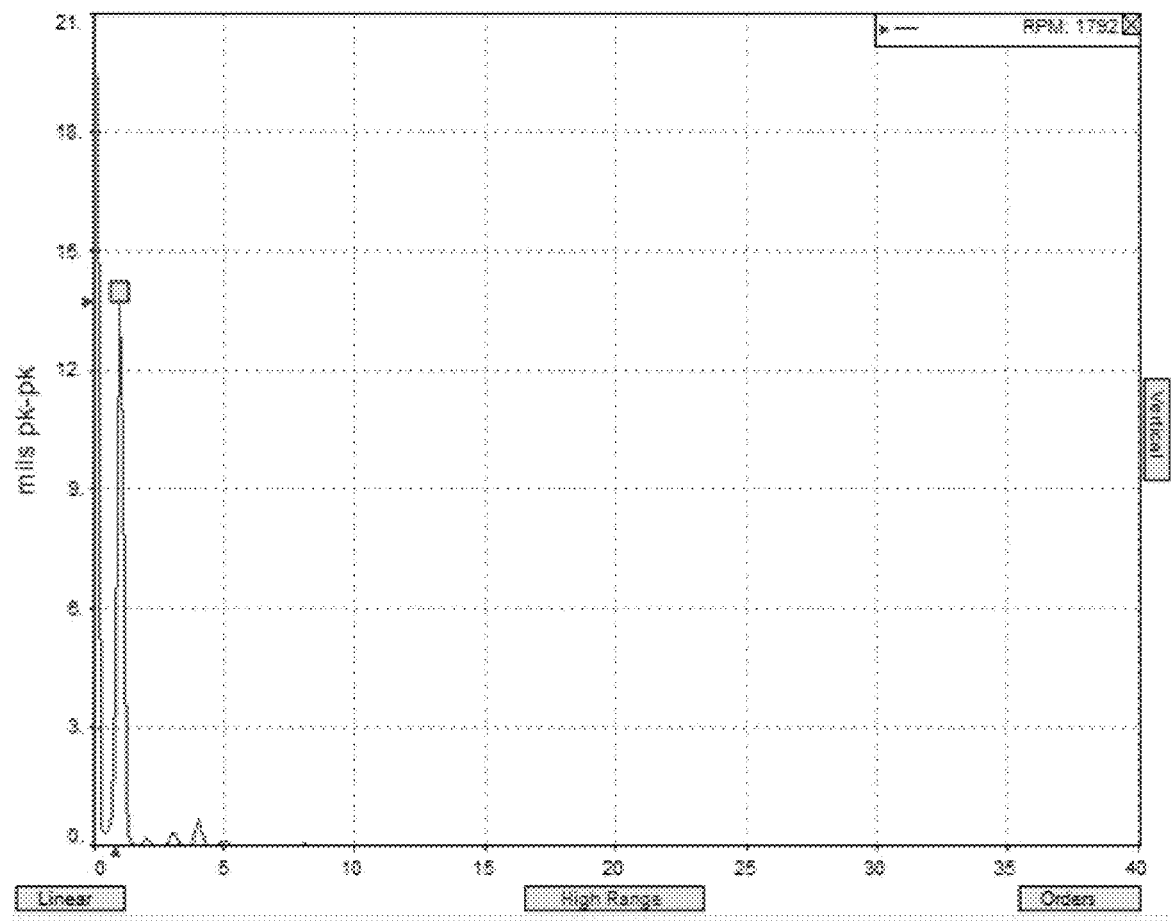
FIGS. 9A-9C are graphs plotting along the Y axis different properties of motion acquired from video of an object or objects, where the X axis in each is frequency ranging from low frequency motions (left side of graph) to higher frequency motions (right side).
Figure 9B:
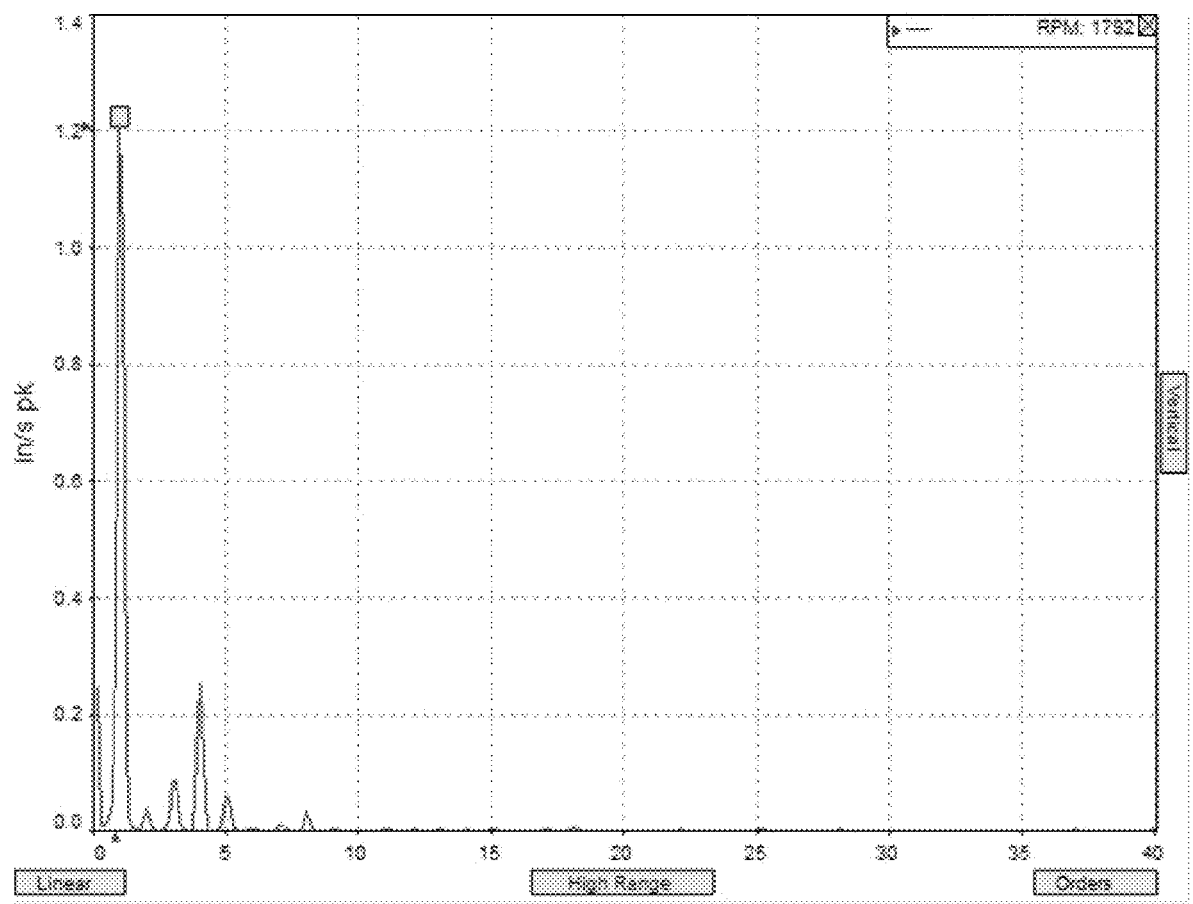
Figure 9C:
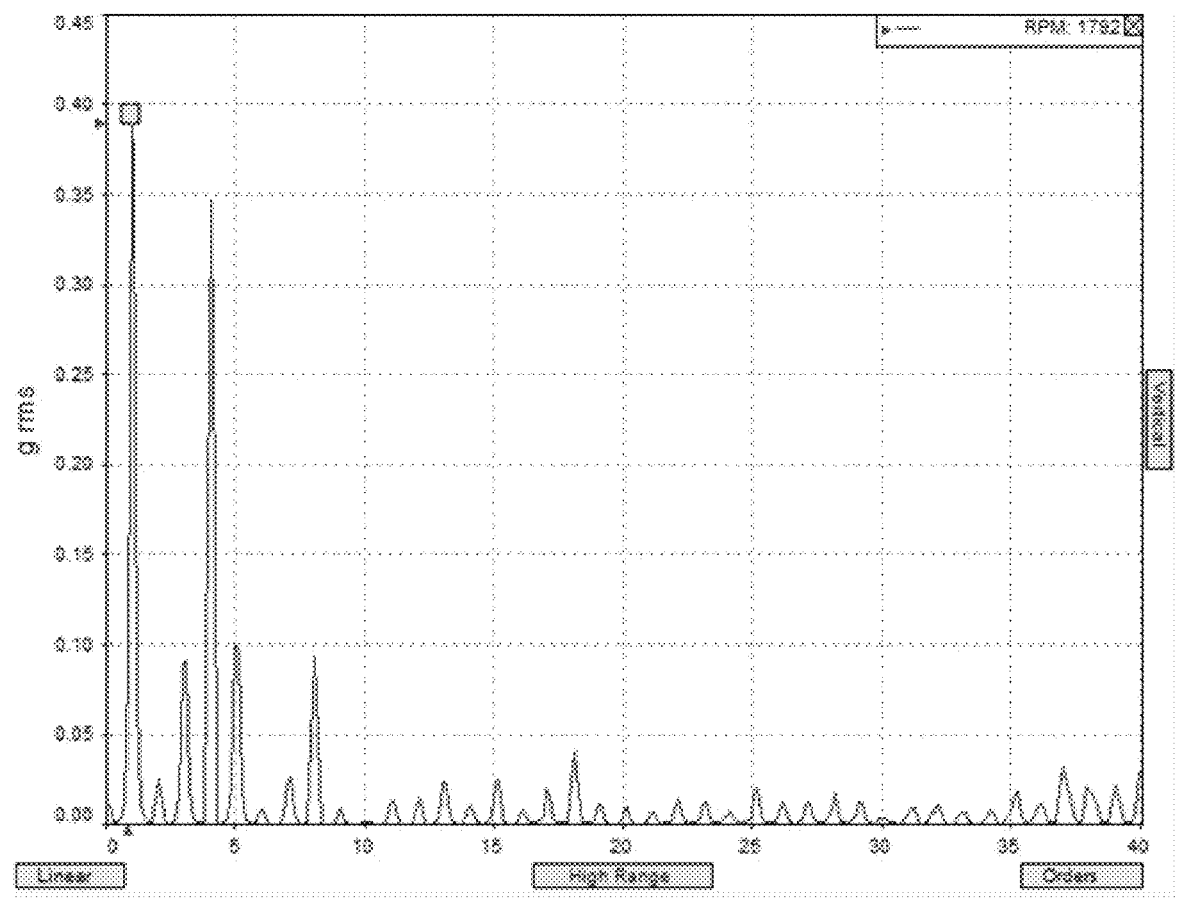

Graphically, these effects are shown in FIGS. 9A-C. FIG. 9A is graph of vibration data shown in units of displacement along the Y axis, with X representing frequency in Hz. In FIG. 9A, most of the peaks are in the lower frequency range. However, it may be the case that the object motion of most interest (i.e., one possibly associated with a fault condition) is not being picked up because its displacement is smaller than the displacement associated with normal machine operation occurring at lower frequencies.

Differentiating the displacement signal and graphing the result provides what is next shown in FIG. 9B, which is a graph of vibration data shown in velocity units (distance/time) over frequency values. Here, it can be observed that other peaks are being portrayed or at least become more prominent, e.g., around 5 Hz. This reflects speed of motion in an object becoming more prominent in the peaks, and not just displacement motion. Differentiating the velocity data that produced a graph such as in FIG. 9B once more provides what is next observed in FIG. 9C, a plot of acceleration (change in velocity over time) over frequency values. Here, yet more peaks are observable, including ones across the spectrum representing higher frequencies.

This capability leads to at least two advantages. First, it becomes possible for an analyst to study the activity at the higher frequencies. In some cases, this is a byproduct of differentiating the signal because the lower frequency motion has smaller acceleration and will be attenuated. In other cases, even if the lower frequency motion is still prominent, filtering techniques exist where lower frequencies can be filter out, in cases where experience tells the analyst these are of less importance. Second, the analyst can now configure the system to amplify selected frequencies, which can be those in the higher ranges. Such an embodiment, then, not only differentiating the signal to change the axis on a graph, but is visually selecting the frequencies of object motion the analyst desires to amplify. By combining differentiated motion of acceleration in an amplified video, the analyst and other stakeholders reviewing the video information are provided visual information of an object's motion that is more easily discerned than seeing it on a graph.

Superimposed Color Overlays to Emphasize Selected Areas of Motion in an Object

In some embodiments, color overlay techniques are employed to facilitate the perception of vibratory motion, whether in displacement, velocity, or acceleration units. Based on the images acquired on video, a user selects all or some of the video and makes point by point measurements of that region within a motion amplified data set. The user then applies a color scheme to the pixels in the scene, where the color palette is indicative of the absolute motion. This functionality improves the user's ability to identify important aspects of the video, and has the benefit of quickly drawing an analyst's attention to certain areas of the video that have high information content and to visually qualify the nature of the changes in the pixel intensity. Likewise, in some embodiments, software is configured to provide another form of color-specific representation comprising motion vectors that have a length, indicating the amount of motion and the direction of motion.

Alternatively, a color overlay may have transparency, where the degree of transparency or opaqueness indicates the magnitude of the motion, and may be selectable by a user or set automatically. For example, lighter transparency may indicate less motion. By way of non-limiting example, a 4-way color wheel may be used to indicate direction of motion. In this situation, +X, −X, +Y, & −Y may each have a unique color. The overlay would blend these colors respective of their directions, so the user can immediately identify the X-Y motion based on the color. Optionally, the level of transparency or opaqueness may then also indicate magnitude of displacement. Accordingly, application of a filter renders static any motion associated with the object that does not meet a preselected threshold for frequency, frequency range, amplitude, amplitude range, or angle of displacement. A color from the scheme is selected either manually by the user or automatically by the data analysis system, the color scheme in which each color in the color scheme indicates a different extent of displacement (e.g., as indicated by measured amplitude) of an object based on its motion. In this way, the system enables the video to be modified by changing the color of at least one pixel in a frame, based on the degree of displacement associated with the at least one pixel. In some embodiments, the modified video is then displayed so it can be viewed by a user on a monitor.

Further Processing of Video Images Based on Spatially Distinct Motions

In some embodiments, measurements are made through video processing techniques that measure motion, for example optical flow or feature tracking methods. The overall motion may be indicated through a color palette on a pixel-by-pixel basis or based on tracking a particular feature as the feature moves location within the scene. Associations between a particular color on the color palette and the degree of motion that color represents can be predetermined and automatically applied by the data analysis system. Alternatively, the system can be configured to enable a user to determine these associations, then saved for later use. In some embodiments, the color is overlaid onto a motion amplified video, in which the motion amplification as a function of displacement is provided in accordance with the teachings of U.S. Pub. No. 2016/0300341, referenced above. Although a color map applied to a single frame may be instructive to some degree, superimposing the color map on to the amplified video gives the analyst the ability to visually qualify the motion that is identified by the colorized pixels in the video. This assists the analyst in disregarding apparent motion which is not real or not important to his investigation.

In some embodiments, software provides a user with capability to draw a box on the screen to limit the amount of the video to be processed to a specific region of the scene as selected by the user. A technique suitable for drawing a box around a specific region is described in U.S. Pub. No. 2016/0300341, identified above. According to preset embodiments, the software may be configured to only show motion with a certain amplitude, perhaps the largest or smallest motions or motions within a certain amplitude, depending either upon automatic settings or user selections as desired.

Likewise, in some embodiments, more complex schemes might be applied to highlight motion with specific characteristics in addition to amplitude-based color mapping. These coloring schemes may include but not be limited to frequency, phase, direction of motion, or amplitude of motions. For example, the user may direct that motion at 30 Hz and above 2 millimeters (mm) be retained, or all motion along a specified directional vector less than 3 mm. The type and amount of motion would then be further delineated using the color schemes, where a first color (e.g., red) indicates larger displacements than a second color (e.g., green). This can be applied to a still frame or it can be applied to the amplified video to allow the analyst to visualize the motion indicated in the colored locations. Although color schemes can be applied to a single still frame selected from the video, applying a color overlay to the amplified video enables the analyst to visually observe the motion underlying colored regions of the video.

Figure 10:
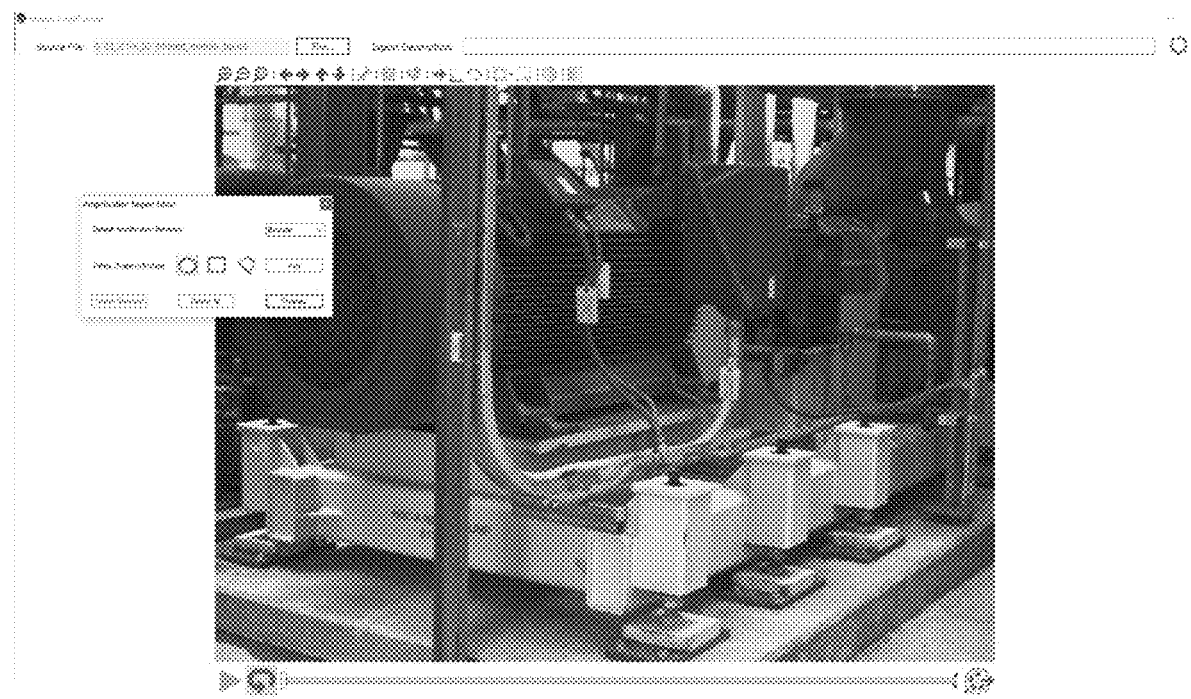
FIG. 10 illustrates the technique of region-based amplification by color coded regions, with or without the use of predetermined shapes manually inserted to frame a particular region that is being included for amplification, or excluded from amplification depending on mode of operation, according to multiple embodiments and alternatives.

In addition, various other motion amplification strategies are available to a user. Accordingly, various embodiments may optionally be configured to include or exclude spatial regions in the video to amplify. A user interface (UI), such as a graphical user interface, may be configured to allow a user to indicate which areas of the machine or component within a scene captured on video are to be amplified and which areas are not. In some embodiments, the UI color codes these areas, for example regions shaded in a first color (e.g., red) may not be amplified while regions shaded in a second color (e.g., green) would only amplify this portion of the video frame. FIG. 10 illustrates how a user may select a region to designate by a particular color and place a shape around that region that has the effect of including or excluding regions for/from amplification, and as desired certain shapes may be set to default. A rectangular shape might be used for a region that is substantially rectangular, and so forth. In some embodiments, as shown in FIG. 10, a user interface is provided that graphically presents optional color schemes and optional shapes for applying a color scheme over any selected object. Any number of shapes, including free form polygons drawn by the user, may be added to a selected frame of the video recording and some shapes may automatically snap to boundaries in the video to automatically overlay objects. Another alternative provides a user with the ability to include or exclude regions with a paintbrush tool. Each identified region might have an amplification slider control, illustrated in FIG. 8A as a vertical slider bar 31 in the right portion of those images, which allows the user to selectively vary the amount of amplification applied to a region. The edges of the regions may be blended into the rest of the video where the amplification falls off as a gradient to blend with the neighboring region, or otherwise to provide contrast and definition of the particular component that is being analyzed.

In some embodiments, software programmed to run on the system automatically determines regions to amplify based on the nature of the motion present, either as a function of amplitude, phase, or frequency. In some embodiments, the apparent motion of certain pixels or objects may be unrealistically large, and the system may suppress some or all of the amplification applied to the pixels in these locations. In another embodiment, areas of high motion may be amplified, and the level of amplification may be selected from a preset list or adjusted. The software may automatically apply the shape to these regions. The user may then edit the shapes after the software has made an initial determination to apply the shapes that are provided. In some embodiments, the software saves shape placement in the video, so it can be recalled after the file is closed and reopened.

Also, in some embodiments a user may configure different preferences for greater efficiency. For example, if a default is configured to "Include," this means the bulk of the scene is depicted with a color overlay of a first color (such as green for amplify), and a user can impose a different colored overlay of a second color (e.g., red) over that which is intended to be excluded from amplification, following which the content in the selected video frame overlaid with the first color will be motion amplified by the software. Alternatively, if a default is configured to "Exclude," recognition of a particular shape will be overlaid with the second color while the remainder is overlaid with the first color, indicating that surrounding motion within the frame will be amplified, but not the motion of an object matching the shape.

Figure 11A:
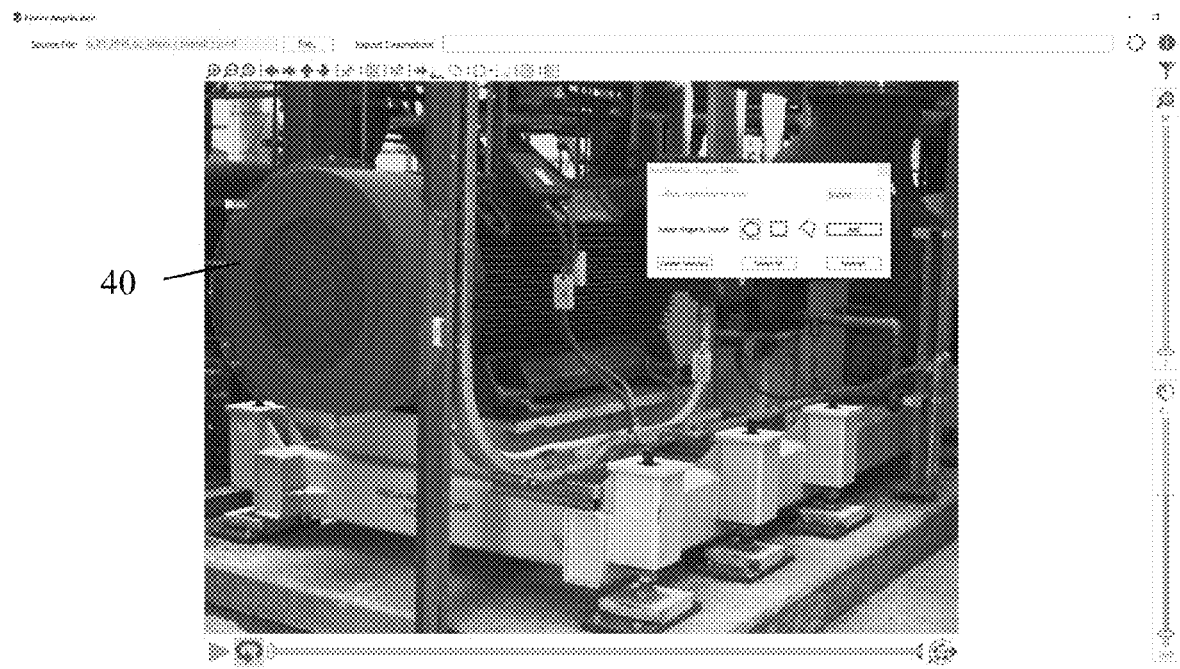
FIGS. 11A-11C illustrate region-based amplification with shapes inserted to frame a particular region included for amplification or excluded from amplification, depending on mode of operation, according to multiple embodiments and alternatives, wherein the system can be configured to automatically recognize the shape of the object or component and applies the shape around it.
Figure 11B:
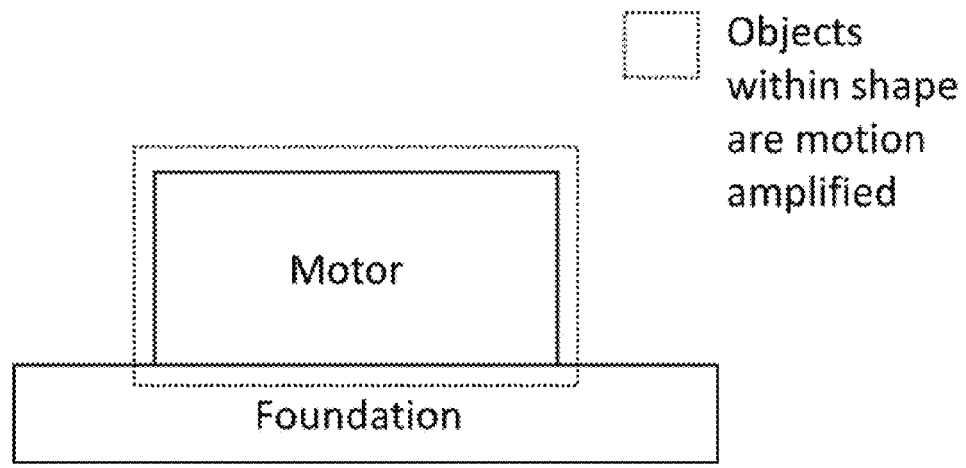
Figure 11C:
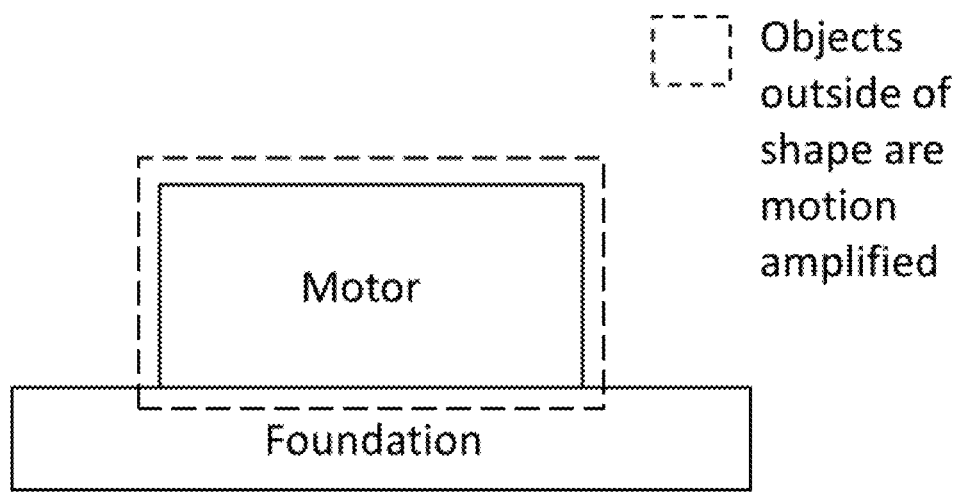
Figure 12:
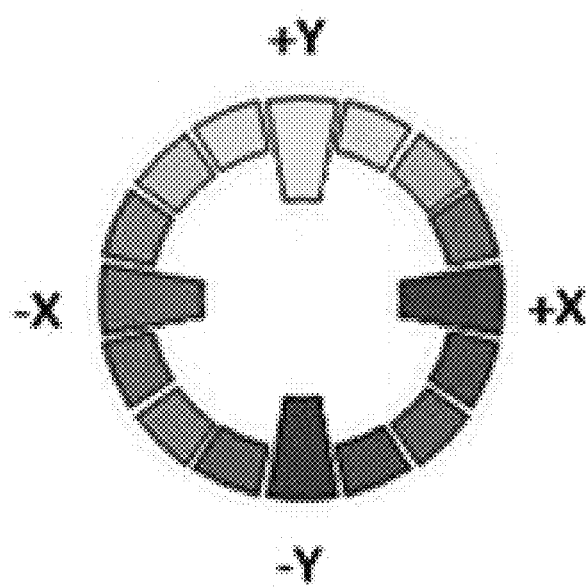
FIG. 12 shows an exemplary 4-way color wheel, in accordance with embodiments described herein.

To illustrate the use of include/exclude shapes, FIG. 11A depicts the machine pictured in FIG. 8A and FIG. 10. As FIG. 11B shows, an object that does fit into that particular shape, in this case the motor which is encompassed by the shape, will be motion amplified. By comparison, in FIG. 11C, the motor is encompassed by the shape, but when configured to "Exclude" mode, the system will bypass motion amplification of the motor, and instead amplify other parts shown in the scene, in this case the foundation. In some embodiments, the software is programmed to recognize or recall the shape of a particular object, and applies the appropriate shape around the region where such object is found. In the particular study or in later ones presenting the same or similar shaped objects, the system then can apply the appropriate color for inclusion or exclusion depending on if the system is using is inclusion or exclusion mode. To further illustrate the inclusion/exclusion principle, in FIG. 11A, the spherical portion 40 of the motor represented in a second color (green) is within the shape, and subject to being included or excluded from amplification depending on the mode.

In all the foregoing respects, present embodiments allow the video depiction of motion and displacement in an object to be enhanced when the video is displayed, making it easier for a user to evaluate the motion for possible current or future problems related to the machine or structure that includes the object.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of embodiments and alternatives are meant to illustrate, rather than to serve as limits on the scope of what has been disclosed herein. The descriptions herein are not meant to limit the understanding of the embodiments to the precise forms disclosed. It will be understood by those having ordinary skill in the art that modifications and variations of these embodiments are reasonably possible in light of the above teachings and descriptions.

What is claimed is:

1. A motion evaluation method for evaluating motion of an object using a plurality of video acquisition devices, wherein an output of at least one of said video acquisition devices comprises recorded video of the object as video files divisible into individual image frames, with each frame providing a static image of the object in a scene, and with each frame being divisible into a plurality of pixels, comprising:

obtaining a first video of the object located in the scene using a first video acquisition device, wherein each video generates a signal indicative of an intensity of at least one pixel contained in at least one frame, wherein the intensity of the at least one pixel varies with the motion of the object;

obtaining a second video of the object using a second video acquisition device;

selecting a first location on the object and obtaining a position of the first location relative to the second video acquisition device, and selecting at least a second location on the object and obtaining a position of at least the second location relative to the second video acquisition device;

determining distance information from the second video acquisition device to each selected location on the object and calculating a difference in distance between at least the position of the first selected location on the object and the position of the second selected location on the object based on said distance information;

receiving by the first video acquisition device at least one of the distance information determined by the second video acquisition device or the calculated difference in distance between the first selected location on the object and the second selected location on the object; and modifying the first video obtained with the first video acquisition device by adjusting for the difference in distance between the first selected location on the object and the second selected location on the object.

2. The motion evaluation method of claim 1, wherein the first video acquisition device comprises a first video camera and the second video acquisition device comprises a second video camera.

3. The motion evaluation method of claim 1, wherein the first video acquisition device comprises a video camera and the second video acquisition device comprises a 3-D camera.

4. The motion evaluation method of claim 1, further comprising configuring a monitor to display the modified first video.

5. The motion evaluation method of claim 1, further comprising measuring an amplitude of the motion of the object, wherein the amplitude is proportional to a difference in intensity of at least one pixel contained in a first frame and the intensity of at least one pixel in a second frame.

6. The motion evaluation method of claim 5, further comprising modifying video obtained with one or both of the video acquisition devices so motion of the object begins at a point of maximum amplitude in the scene.

7. The motion evaluation method of claim 5, further comprising modifying video obtained with one or both of the video acquisition devices so motion of the object begins at a point of minimum amplitude in the scene.

8. The motion evaluation method of claim 5, further comprising creating a waveform as a representation of the motion of the object.

9. The motion evaluation method of claim 5, further comprising visually amplifying the motion of the object depicted in the first video by modifying at least one frame of the first video by multiplying an amplitude in at least one pixel by an amplification factor.

10. The motion evaluation method of claim 9, further comprising overlaying at least one color scheme on the object whose motion is amplified.

* * * * *